July 1, 1958  K. SCHWENK  2,841,439
SELF-SUPPORTING BODY OF A CAR VEHICLE
Filed Nov. 13, 1953  3 Sheets-Sheet 1

Inventor:
Kurt Schwenk
BY
Richards & Geier
ATTORNEYS

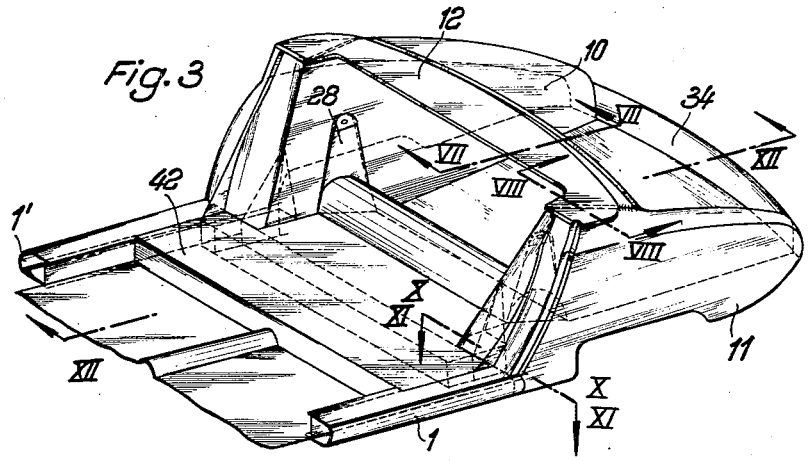
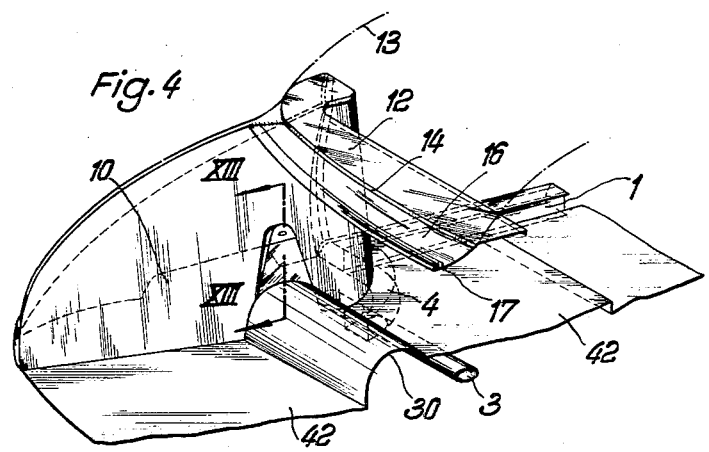
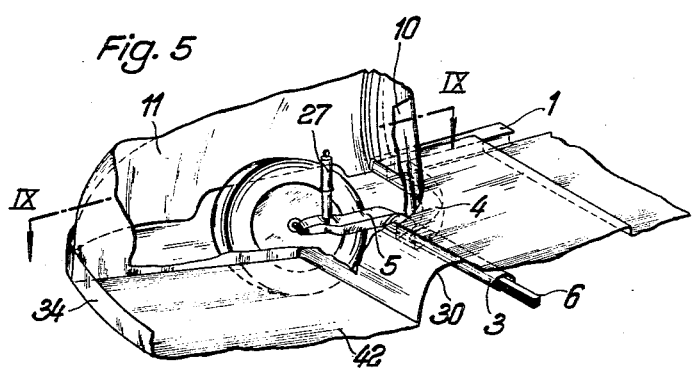

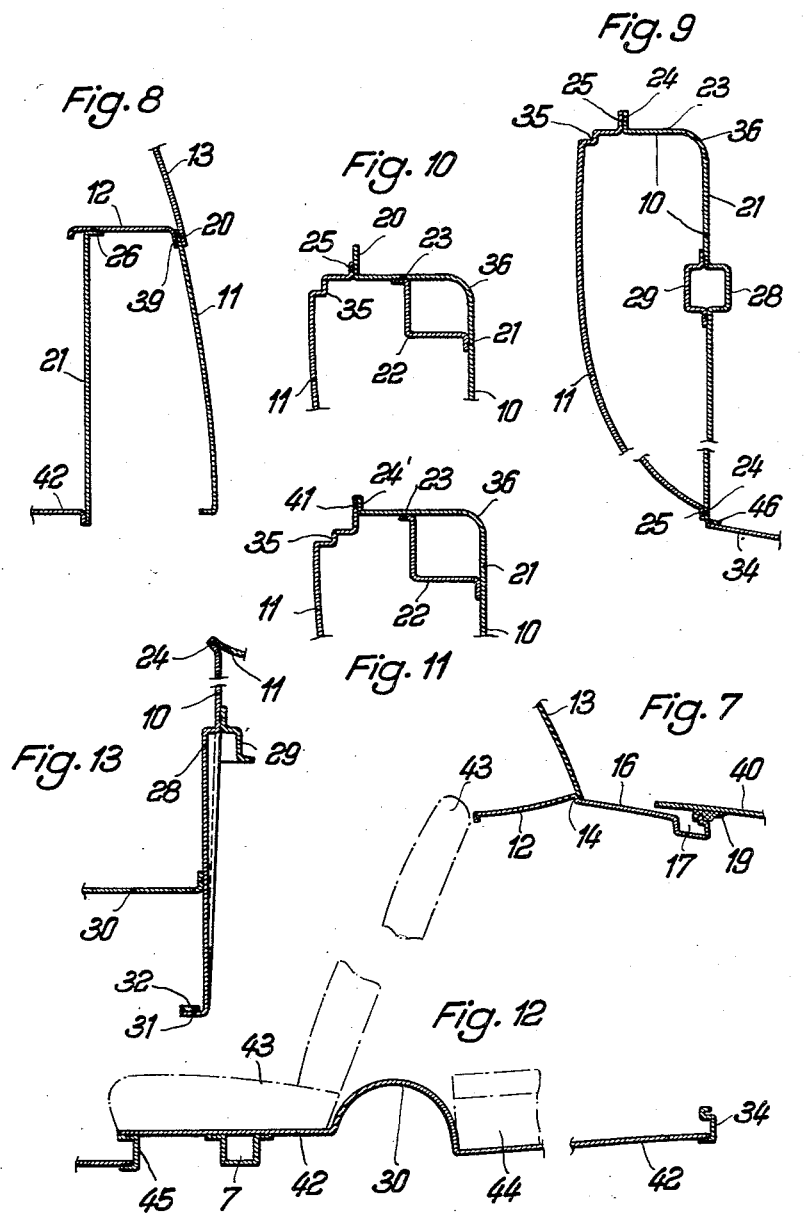

United States Patent Office 2,841,439
Patented July 1, 1958

2,841,439

SELF-SUPPORTING BODY OF A CAR VEHICLE

Kurt Schwenk, Ingolstadt (Danube), Germany

Application November 13, 1953, Serial No. 391,938

Claims priority, application Germany November 13, 1952

6 Claims. (Cl. 296—28)

This invention relates to a car body and refers more particularly to a car body which is self-supporting and/or which may be combined with a chassis. The invention is particularly concerned with a car body having a frame which terminates substantially in front of the rear axle and which receives the rear wheel bracket.

An object of the present invention is to provide a car body having a rear portion of extremely light weight which is most stable in use.

Another object is the provision of a car body the rear of which is so constructed that it will not be affected by reaction forces transmitted by the wheels.

Yet another object is the provision of a car body having a rear section which is composed of a considerably smaller number of individual parts than heretofore and which despite its light weight is of relatively great strength and resistance so that it can be used for carrying substantially great loads.

Other objects of the present invention will become apparent in the course of the following specification.

In accomplishing the objects of the present invention it was found advisable to employ a comparatively short torsion-free floor frame which receives on two sides at its rear end wheel brackets with longitudinal guides which are preferably resiliently supported in relation to the frame by torsion rods extending in their supporting axis or by shearing elements. In accordance with the present invention the wheel brackets or supports consist solely of inner and outer casings and a transverse element common to brackets and form girders which are attached to the frame. They are interconnected only by a floor element the rear edges of which can form, by way of example, a lock or closure for the rear compartment of the vehicle. The transverse member which is common to the two wheel supports is mounted at the front upper ends thereof and forms an upper torsion-free closure for the front wheel supports. This constitutes furthermore a separation of the interior of the vehicle occupied by the passengers from the rear compartment which, by way of example, may be used for the luggage. The transverse member can then serve as a support for the rear seats and, on the other hand, since it projects under the roof which is connected therewith, it can form a part of the outer cover of the vehicle body which extends between the roof and the cover of the rear compartment.

Furthermore, in accordance with the present invention the casing portions of the wheel supports extend forward to the line designating the door opening and there have strengthened edges and are interconnected; due to this arrangement the provision of a separate door post or additional strengthening element can be dispensed with. The line separating the inner and outer wheel support casings is located in the wall surface of the front wheel support so that the door channel can be formed from the outer and/or inner casings which contain correspondingly profiled elements for receiving the door connections.

An important advantage of the invention is the fact that the rear portion of the car body can be made of a smaller number of parts than was customary heretofore and that it is quite strong while of light weight and can be used for receiving a substantial load.

There are few pressed on elements which are quite large; they can be manufactured economically and assembled by simple machinery. The connections, particularly the lines of welding, can be so arranged through suitable arrangement of the vehicle covering that they will not be visible from the outside; else they can be concealed by ornamental ledges.

The invention will appear more clearly from the following detailed description when taken in connection with accompanying drawings showing, by way of example, a preferred embodiment of the inventive idea.

In the drawings:

Figure 3 is a perspective view of the rear of the vehicle body, looking from the front and above;

Figure 4 is partly a perspective view and partly a section of the rear portion of the vehicle body, looking somewhat from above;

Figure 5 is partly a side view and partly a section and illustrates portions of the rear frame and a support for a rear wheel;

Figure 7 is a section through a transverse member 12 taken along the middle of the car, namely along the lines VII—VII of Figures 2 and 3;

Figure 8 is a section through the front portion of a wheel support transversely to the direction of the vehicle taken along the lines VIII—VIII of Figures 1, 2 and 3;

Figure 9 is a horizontal section through a wheel support taken along the line IX—IX of Figure 1;

Figure 10 is a horizontal section through a wheel support taken substantially at the level of the upper edge of the frame along the line X—X of Figures 1 and 3;

Figure 11 is a horizontal section substantially similar to the section illustrated in Figure 10, the inner wheel support casing being shifted forwardly, however, as indicated by the lines XI—XI in Figures 1 and 3;

Figure 12 is a longitudinal section through the floor along the line XII—XII of Figures 2 and 3;

Figure 13 is a section through the floor and the wheel support, transversely to the direction of the vehicle along the lines XIII—XIII of Figures 1, 2 and 4.

Figure 1:
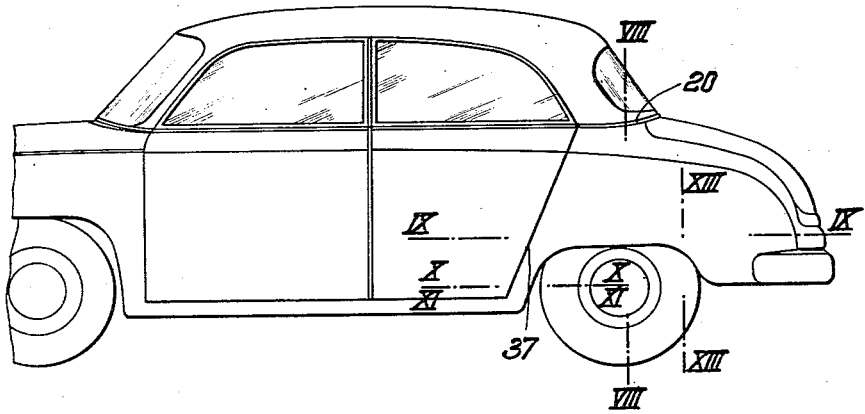
Figure 1 is a side view of a vehicle body having four doors and constructed in accordance with the principle of the present invention.

The vehicle bodies shown in the drawings are preferably made of steel sheets and, as illustrated, pertain to a passenger automobile having four doors. The vehicle has a rectangular floor frame located between the axles so that it is quite short and torsion-resistant. Cantilevers are connected to the wheel axles in front and in the rear.

The construction shown in Figures 1 to 5 and 7 to 13 of the drawings comprises elongated, box-shaped supports 1 and 1' which are closed and interconnected by a transverse tube 3 (Figures 3 and 5). The tube 3 is connected with the supports 1 and 1' by brackets 4 and constitutes a support for the longitudinal length 5 of the wheel brackets. Torsion spring rod 6 is located within the tube 3.

The frame ends substantially in front of the rear axle and is extended rearwardly by the wheel supports in the form of a girder. In accordance with the present invention the wheel supports consists of two casing sections, namely the inner section 10 and the outer section 11 (Figure 3). The front portions of the members 10 and 11 are covered from the above by transverse member 12 which at the same time interconnects the two rear wheel supports of the body; furthermore the connecting member 12 separates the passenger compartment of the vehicle from the luggage compartment and extends rearwardly below the roof 13 (Fig. 4). A support 14 is attached by pressing and makes it possible to mount the roof 13 and to be joined with it by welding. It is advisable to cover the connection at this location by means of an ornamental border since the connection is located substantially upon the girth line (Figure 1).

As shown in Figure 8, the outer wheel support casing 11 and the lower edge of the roof 13 are joined by welding with a flange 39 constituting a part of a member 14 of the transverse support 12.

The transverse member 12 has an outer surface 16 which forms the outer covering of the vehicle between the end of the roof and the opening of the rear compartment (Figure 4). The transverse member 12 forms a rain channel 17 at the edge of which a sealing member 19 is attached (Figure 7). The rain groove 17 is somewhat covered by the cover 40 of the rear compartment in the closed position.

Figure 5 shows that the frame is so constructed that the wheel support casings can be connected to it in such manner that they enclose the wheel support. As shown in Figures 9, 10 and 11 the inner wheel support casing 10 has approximately the form of a Z in a horizontal section at the point of connection with the frame. The outer forwardly projecting portion 20 of this Z is formed by interconnection with the circumferential flange 24 which serves as connection with the outer wheel support casing 11. As shown in Figure 10, the flange 24 extends in the form of a flange extension 20 in the direction of the longitudinal supports 1 and 1' and is welded to them in a manner which prevents bending in the forward direction.

As shown in Figure 11 the inner wheel support casing 10 can be shifted forward farther than the outer wheel support casing 11 so that the encircling flange 24 has the same width up to this connection with the supports 1 and 1', while the flange 25 of the outer wheel support casing 11 in the direction toward the frame goes over into a further flange 41. The inner wheel support casing 10 includes a wall 21 which extends substantially perpendicular and to the rear, forming the other side piece of the Z. The projection 21 is supported upon the carrier 4 (Figure 5) which extends to the side and which connects the tube 3 with the longitudinal carriers 1 and 1'.

The inner wheel support casing 10 and the outer casing 11 are welded one to the other and are provided with forwardly projecting flanges 24 and 25 and rearwardly projecting flanges 24' and 41 which are preferably joined by spot welding (Figures 9 and 11). The connecting flanges 24 and 25 are broken off in the upper front portion of the casing to the extent that the transverse member 12 forms a portion of the casing wall. As shown in Figure 8, a flange 26 lies against the transverse member 12 while in the direction of the line 20 the outer wheel casing 11 is also connected with the lower edge of the overlapping roof portion 13 and with the outer flange portion 39 of the member 14. In the region between the member 14 of the transverse member 12 and the side front corner of the opening of the rear compartment the outer wheel support casing 11 engages directly the surface 16 of the transverse member 12 which forms a part of the outer covering of the vehicle, whereby the casing 11 is welded with the surface 16 (Figure 7). This short welding connection is covered to a large extent by the cover 40 which extends over the opening of the rear compartment on all sides in the closing position; thus this welding connection does not require any special surface treatment. The flanges 24 and 25 in their rearwardly extending sections limit the opening of the rear compartment.

The inner wheel support casing 10, due to its arrangement as a vertical wall 21, forms a column, or support, which has great resistance in the vertical direction. Thus the casing 10 is excellently suited to receive further forces transmitted by the engine to the car body. Thus the effective surface of the shock absorber 27 connected to the longitudinal guide 5 is located approximately in the surface 21 of the inner wheel support casing 10 (Figures 5 and 9); the shock absorber 27 is mounted in a recess 28 and, jointly with a supporting member 29, is mounted upon the inner wheel support casing 10 (Figures 9 and 13). The side resistance of the casing wall 21 is attained by its connection at the lower edge with the bottom 42 (Fig. 8). Furthermore the curvature of the outer casing 11 adjoining the flange 24 provides an additional support (Fig. 9). Finally, the transverse member 12 contributes greatly to the side stability. Within the region of the recess 28 provided in the wall 21 for the reception of the shock absorber 27 the buckling danger is balanced by the specific form of the floor. The floor 42 is bent upwardly within the region of the rear wheels for the provision, for example, of a round gasoline container which is built in from the bottom. This provides a tunnel-like connection 30 (Figs. 4 and 5) between the casings so that the recess 28 is further strengthened in the buckling direction of the wall 21. The tunnel-like portion 30 is closed at the sides by the lower edges of the walls 21 which extend straight downwardly; the walls 21 of the wheel casing are strengthened within the region of the tunnel-like member by a flange 31 and a reinforcing member 32 which has its greatest resistance toward the side and which extends into the bottom 42 to the front as well as to the rear.

The floor 42 extends forward beyond the frame in the form of the bottom of the rear compartment and, furthermore, is used as a closure for the rear transverse box-shaped support 7 (Fig. 12). The bottom 42 lies sideways upon the longitudinal supports 1 and 1' and extends forward to an angle iron 45 which interconnects the longitudinal carriers and which constitutes the rear end of the space available for the feet of the passengers. To the rear the floor 42 is limited by an angle iron 34 which closes the rear compartment and which at the side is connected with a flange 46 of the inner wheel support wall 21.

It is also possible to make the bottom 42 and the angle iron 34 of one piece.

The passenger seats 43 have an upper edge lying against the transverse member 12 (Fig. 7) while the lower edge lies against the tunnel-shaped member 30 (Fig. 12). The member 30 extends at right angles in in the rear portion of the floor 42 so that any load 44 placed within the rear compartment will find adequate support at the front.

Figure 2:
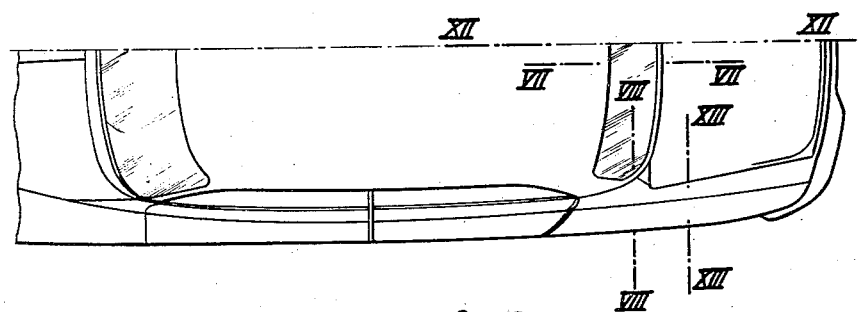
Figure 2 is a top view of one-half of that body.

As shown in Figs. 1 and 2, the four doors are attached at the front. In accordance with the present invention the wheel casings extend forward up to the line 37 representing the door opening. As shown in Fig. 9 the edges of the inner and outer casings 10 and 11 form at the same time door channels 35. The door channels 35, the flanges 45 and 25 which are interconnected by welding, as well as the edge 36 of the inner wheel support casing 10 serve at this location as a column-like support of the car body which furthermore is closed on the top by the covering transverse member 12 so that it is particularly torsion-free. The wheel support casings 10 and 11 are provided with recesses which are necessary for receiving the door sections. Due to this arrangement a door post is created which is formed solely by the car body, without the use of any additional reinforcing elements.

In accordance with the present invention the direction of the line 37 is essentially immaterial. In the example shown in Fig. 1 the line 37 is straight in side elevation. The advantage of this arrangement is that the tools for manufacturing the outer casing 11 are thus easy to make and will be cheaper. The setting of the door upon the provided opening in the wheel body will also be simpler. Furthermore, the use of a straight edge increases considerably the resistance of the front postlike car body wall as compared with the curved door line.

Figure 6:
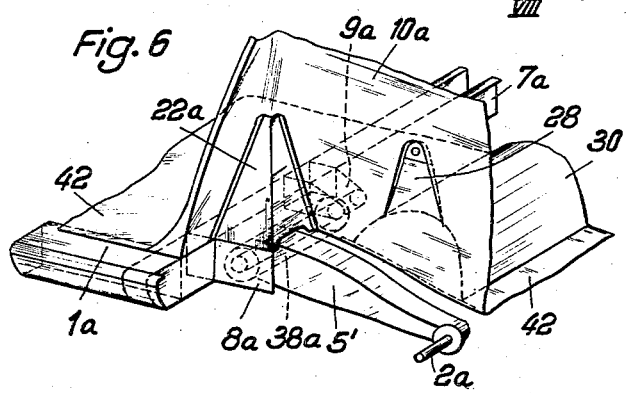
Figure 6 is a perspective view of a somewhat differently constructed rear portion of a vehicle body.

Fig. 6 shows a modified embodiment of the inventive idea wherein a straight casing carrier 7a closes the frame from the rear. Two flanges 8a and 9a are attached to the carrier 7a on opposite sides. A longitudinal guide 5' for the wheel axle 2a is removably connected with the flanges 8a and 9a in conjunction with a spring 38a. The outer flange 8a which is located next to the member 5' receives in addition to the vertical forces the torsional forces produced by the springs, while the flange 9a is used particularly for receiving transverse forces which might arise.

This construction, similarly to that shown in Fig. 5, makes it possible to connect the wheel casings in such manner that they enclose the wheel suspension means. In this construction the flange 8a of the transverse carrier 7a is used for supporting the inner casing 10a which corresponds to the casing 10 of Fig. 5. The flange 8a is used to transmit forces exerted by the wheel in the vertical direction upon the transverse carrier 7a. Since the vertical wheel casing wall is shifted in relation to this flange 8 toward the middle of the vehicle by the width of the longitudinal guide 5', the connecting member 22a is located between the rearwardly extending outer projection (corresponding to the projection 21 of the previously described construction) and the middle projection of the inner casing portion 10a (corresponding to the projection 23 of the previously described construction).

The member 22a is mounted upon the flange 8a and is preferably welded therewith. Thus this member 22a, along with the inner casing portion 10a, forms a hollow post which preferably tapers upwardly. Due to this arrangement the forces resulting from the load in the rear compartment are transmitted to a large extent directly over the flange 8a and the supports carrying the wheels.

It is apparent that the examples shown above have been given solely by way of illustration and not by way of limitation and that they are subject to many variations and modifications within the scope of the present invention. For example, the subject matter of the present invention is applicable, in principle, to the construction of the front portion of a vehicle body. All such and other variations and modifications are to be included within the scope of the present invention.

What is claimed is:

1. In a car body having a rear axle, and a short horizontal frame ending in front of the rear axle, a girder-like rear wheel support comprising two rear wheel support casings, each of said casings having outer and inner spaced casing sections, said sections having rigid edges which are welded to each other to form an upwardly extending post, at least one of the sections of each casing being directly connected to said frame, said outer casing sections constituting the outer covering of the car body, and a top transverse member interconnecting the two casings and closing said post.

2. In a car body having a roof; a girder-like rear wheel support comprising two rear wheel support casings, each of said casings having spaced upright outer and inner casing sections, the front edges of the two casing sections being welded to each other and the rear edges of the two casing sections being welded to each other, and a top transverse member extending from one side of the car body to the other and firmly connected to some of the upper edges of the casing sections of said casings, whereby said top traverse member constitutes a cover for a portion of the inner space located between the outer and inner casing sections of each casing, said roof being connected to said top transverse member intermediate the edges of the top transverse member.

3. A car body in accordance with claim 2, said car body having a rear-compartment cover, wherein said top transverse member is located on the level of the girth line of the vehicle and comprises a section forming an outer covering of the car body and extending between said rear-compartment cover and the connection of the top transverse member with the roof.

4. In a car body having two upwardly extending shock absorbers; a girder-like rear wheel support comprising two rear wheel support casings, each of said casings having spaced upright outer and inner casing sections, the front edges of the two casing sections being welded to each other and the rear edges of the two casing sections being welded to each other, and a top transverse member extending from one side of the car body to the other and firmly connected to some of the upper edges of the casing sections of said casings, whereby said top transverse member constitutes a cover for a portion of the inner space located between the outer and inner casing sections of each casing, each of said inner casing sections having an upright recessed portion intermediate the front and rear edges thereof, said recessed portion constituting a hollow column receiving a separate shock absorber.

5. In a car body; a girder-like rear wheel support comprising two rear wheel support casings, each of said casings having spaced upright outer and inner casing sections, the front edges of the two casing sections being welded to each other and the rear edges of the two casing sections being welded to each other, and a top transverse member extending from one side of the car body to the other and firmly connected to some of the upper edges of the casing sections of said casings, whereby said top transverse member constitutes a cover for a portion of the inner space located between the outer and inner casing sections of each casing, each of said inner casing sections having an angular portion extending toward the front edge of the adjacent outer casing section, another angular portion extending away from the rear edge of said adjacent outer casing section, and an intermediate portion, whereby each of said inner casing sections has the shape of a Z in cross section.

6. In a car body; a girder-like rear wheel support comprising two rear wheel support casings, each of said casings having spaced upright outer and inner casing sections, the front edges of the two casing sections being welded to each other and the rear edges of the two casing sections being welded to each other, and a top transverse member extending from one side of the car body to the other and firmly connected to some of the upper edges of the casing sections of said casings, whereby said top transverse member constitutes a cover for a portion of the inner space located between the outer and inner casing sections of each casing, each of said inner casing sections having an angular portion extending toward the front edge of the adjacent outer casing section, another angular portion extending away from the rear edge of said adjacent outer casing section and an intermediate portion, whereby each of said inner casing sections has the shape of a Z in cross section, and a separate upright angular member located between the inner and outer casing sections of each casing and having edges welded to inner surfaces of the inner casing section between the angle of one of said angular portions, whereby that angular portion and said angular member form a hollow upright.

References Cited in the file of this patent

UNITED STATES PATENTS

| | | |
|---|---|---|
| 2,250,654 | Saives | July 29, 1941 |
| 2,271,310 | Schafer | Jan. 27, 1942 |
| 2,335,058 | Haltenberger | Nov. 23, 1943 |
| 2,370,211 | Ulrich | Feb. 27, 1945 |
| 2,525,339 | Chausson | Oct. 10, 1950 |
| 2,538,839 | Limberg | Jan. 23, 1951 |
| 2,645,519 | Stanfield et al. | July 14, 1953 |
| 2,662,793 | Lindsay | Dec. 15, 1953 |

FOREIGN PATENTS

| | | |
|---|---|---|
| 762,366 | France | Jan. 22, 1934 |
| 870,108 | France | Dec. 5, 1941 |
| 993,057 | France | July 18, 1951 |
| 436,639 | Great Britain | Oct. 15, 1935 |
| 671,127 | Great Britain | Apr. 30, 1952 |

(Corresponding U. S. 2,733,096, Jan. 31, 1956.)